United States Patent [19]
Wright

[11] Patent Number: 5,286,093
[45] Date of Patent: Feb. 15, 1994

[54] REVERSE DRAWN WHEEL TRIM SYSTEM

[76] Inventor: James P. Wright, 1060 Robin La., Cookeville, Tenn. 38501

[21] Appl. No.: 957,358

[22] Filed: Oct. 5, 1992

Related U.S. Application Data

[63] Continuation-in-part of Ser. No. 909,030, Jul. 6, 1992.

[51] Int. Cl.⁵ .................................................. B60B 7/14
[52] U.S. Cl. .................................. 301/37.37; 301/108.4
[58] Field of Search .................. 301/37.1, 37.37, 108.1, 301/108.4

[56] References Cited

U.S. PATENT DOCUMENTS

| | | | |
|---|---|---|---|
| 1,906,307 | 5/1933 | Booth | 301/108.4 X |
| 2,491,506 | 12/1949 | Lyon | 301/37.37 X |
| 3,092,421 | 6/1963 | Lyon | 301/37.37 |
| 4,606,582 | 8/1986 | Warren | 301/37.37 |
| 4,632,465 | 12/1986 | Cummings | 301/108.4 |
| 5,048,898 | 9/1991 | Russell | 301/37.37 |
| 5,193,884 | 3/1993 | Sheu et al. | 301/37.37 |

FOREIGN PATENT DOCUMENTS

| | | | |
|---|---|---|---|
| 919394 | 10/1954 | Fed. Rep. of Germany | 301/37.37 |
| 2510045 | 1/1983 | France | 301/108.4 |

*Primary Examiner*—Russell D. Stormer
*Attorney, Agent, or Firm*—Edward D. Lanquist, Jr.; Mark J. Patterson; I. C. Waddey, Jr.

[57] ABSTRACT

The present invention discloses a wheel trim attachment system which does not require the removal of the existing lug nuts. A trim member has holes to receive the existing studs and lug nuts. At least one of these holes is sized to frictionally fit over one of the existing lug nuts. This particular hole also has a flange, swept area, or reverse draw which is placed substantially perpendicular to the base of the trim member thereby providing a large area over which frictional fit between the trim member and the lug nut can be made.

4 Claims, 3 Drawing Sheets

REVERSE DRAWN WHEEL TRIM SYSTEM

This is a continuation-in-part of U.S. patent application Ser. No. 909,030 filed Jul. 6, 1992, for a "Nested Wheel Trim System".

BACKGROUND OF THE INVENTION

The present invention relates generally to an attachment for decorative wheel trim members to motor vehicle wheels and more particularly to a wheel trim attachment system which is reverse drawn for improved fit and strength.

It will be appreciated by those skilled in the art that many owners of trucks and recreational vehicles use wheel trim members to improve the cosmetic appearance of their wheels by adding decorative trim rings and the like. The same wheel trim attachment systems are used for heavy trucks. Unfortunately, the Department of Transportation requires that these trim members be removable to allow easy inspection of the axle. Also, many manufacturers require that OEM wheel trim members be attachable to a wheel without removal of the existing lug nuts. It will be further appreciated by those skilled in the art that given the requirements by the Department of Transportation and many motor vehicle manufacturers, that the state of the art wheel trim attachment systems are very bulky and take up much room during shipping thereby greatly increasing the cost of shipping the product.

Past attempts to directly attach wheel trim systems have been fairly successful. Unfortunately, they have not been without flaws. Most lugs are ball seated. The wheel has a curved rim to receive a lug with a curved lower side. This creates an indention between the lug and the seat. Past trim members have a substantially flat surface approaching the lug/seat attachment perpendicularly to the axis of the stud. This creates a sharp edge either rubbing against the lug or trapped with the recess. The edge is further stress by the attachment of the existing lug or the additional lug nut. If the lug nut is attached too tightly, the area around the edge will crack. If it is too loose, the play will cause it to crack. The trim members are usually made of cold rolled metal which can be very brittle. The combination of the sharp point and the cold rolled steel creates the cracking tendency. Further, should the trim member be used under the existing lug nuts, the chance of cracking of the wheel increases. Further, because of safety reasons, the D.O.T. has more rigorously inspected wheels for cracking. Therefore, it is more important than ever to have a trim member which can be removed without removing the existing nuts.

What is needed, then, is a wheel trim attachment system which can be attached to a wheel without removal of the existing lug nuts. This needed system must be inspectable by the Department of Transportation without removing the existing lug nuts. This needed wheel trim attachment system must be shaped so as to prevent cracking. This need wheel trim system must frictionally fit to the existing lug nuts to improve attachment. This needed wheel trim system must have a large swept area to improve the fit and structural integrity of the system. This needed system is presently lacking in the prior art.

SUMMARY OF THE INVENTION

The present invention discloses a wheel trim attachment system which does not require the removal of the existing lug nuts. A trim member has holes to receive the existing studs and lug nuts. At least one of these holes is sized to frictionally fit over one of the existing lug nuts. This particular hole also has a flange, swept area, or reverse draw which is placed substantially perpendicular to the base of the trim member thereby providing a large area over which frictional fit between the trim member and the lug nut can be made.

Accordingly, one object of the present invention is to provide a wheel trim attachment system for heavy duty vehicles.

Still another object of the present invention is to provide a wheel trim attachment system which can be attached to a standard wheel without removal of existing lug nuts.

Still a further object of the present invention is to provide a wheel trim attachment system which allows for the Department of Transportation inspection of the axil without removal of the existing lug nuts.

A still further object of the present invention is to provide a wheel trim attachment system which is shaped so as to prevent cracking.

A further object of the present invention is to provide a wheel trim attachment system which frictionally fits to the existing lug nuts to improve attachment.

Another object of the present invention is to provide a wheel trim system which has a large swept area to improve the fit and structural integrity of the system.

DESCRIPTION OF THE PREFERRED EMBODIMENT

Figure 1:
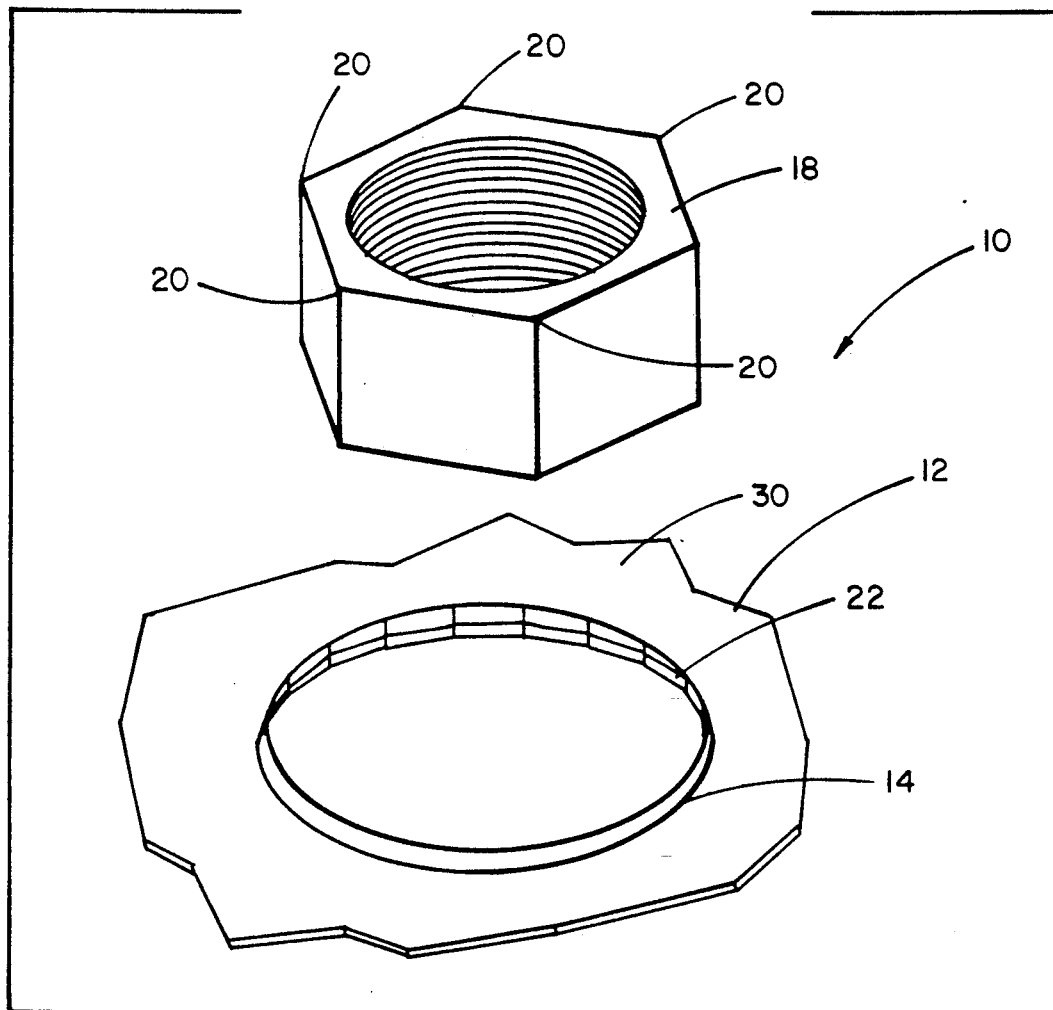
FIG. 1 is an exploded perspective view of the nested wheel trim system of the present invention.

Referring now to FIG. 1 there is shown generally at 10 the reverse drawn wheel trim system of the present invention. System 10 has trim member 12 which has hole 14 which receives existing lug nut 18. Trim member 12 has first axis 26 and second axis 28 perpendicular to first axis 26. First axis 26 lies approximately along base 30 of trim member 12 whereas second axis 28 is approximately perpendicular to base 30 of trim member 12. Around hole 14 there is placed reverse draw 22 which is a flange or a swept area rising approximately perpendicular to base 30 and approximately parallel or along second axis 28. Hole 14 and reverse draw 22 are sized so as to frictionally fit or attach to points 20 of lug 18.

Figure 2:
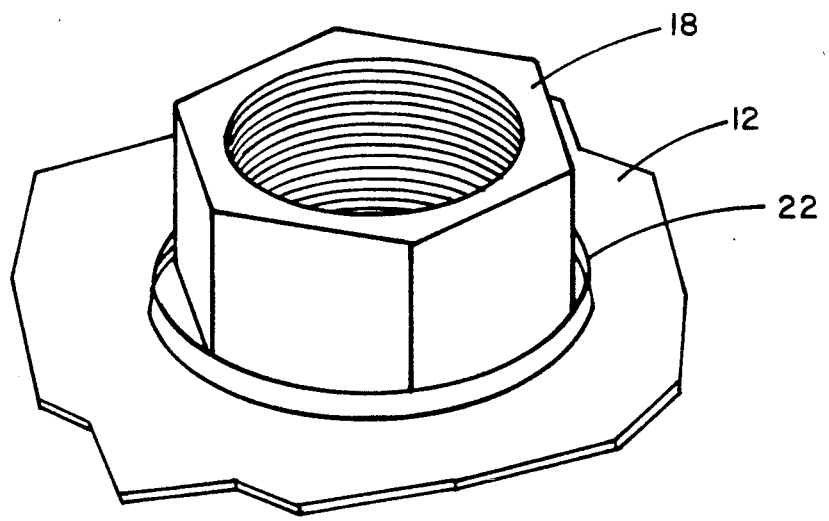
FIG. 2 is a perspective view of the nested wheel trim system of the present invention.
Figure 3:
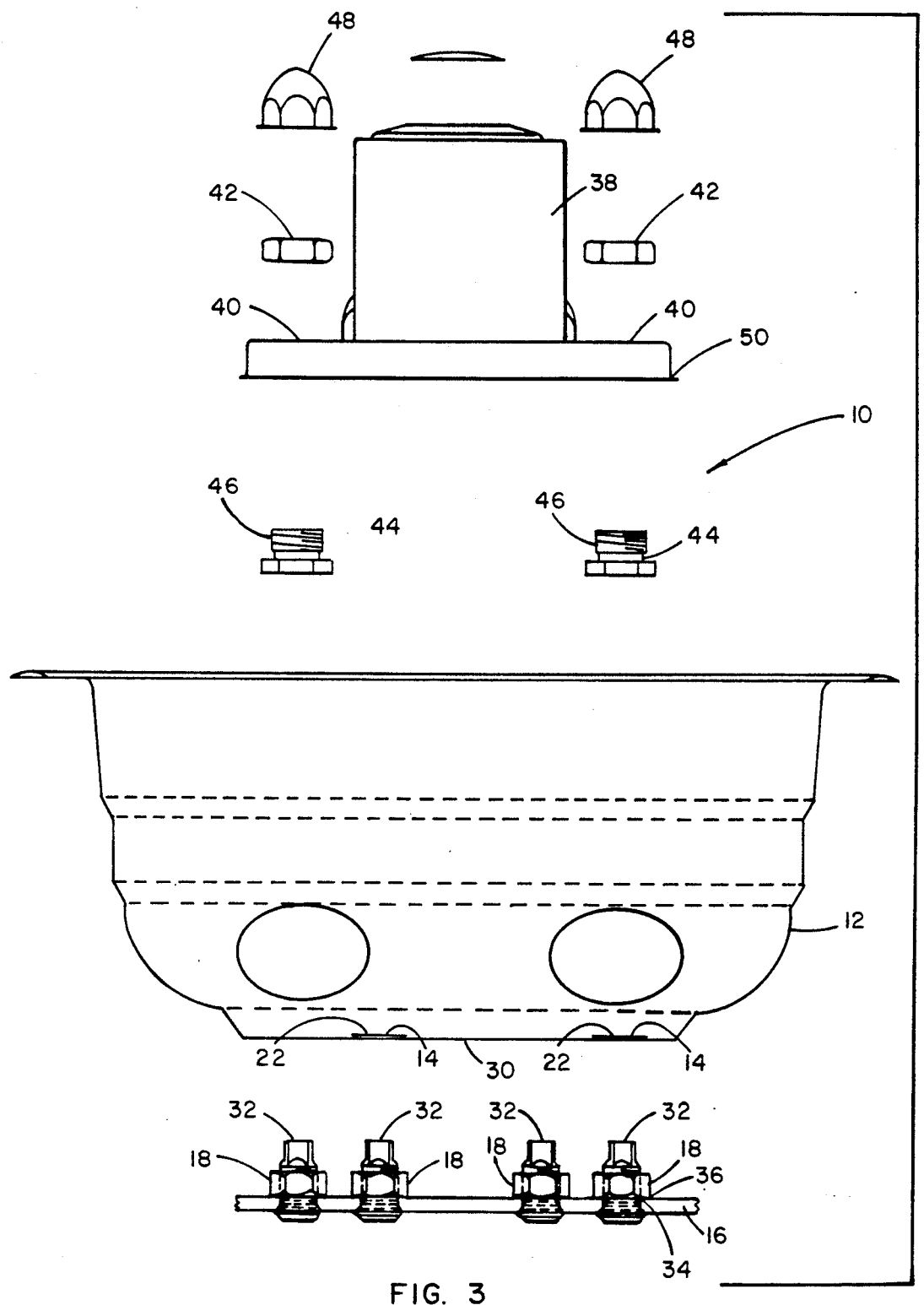
FIG. 3 is an exploded view of the wheel trim attachments attached to a rear or deep well wheel.
Figure 4:
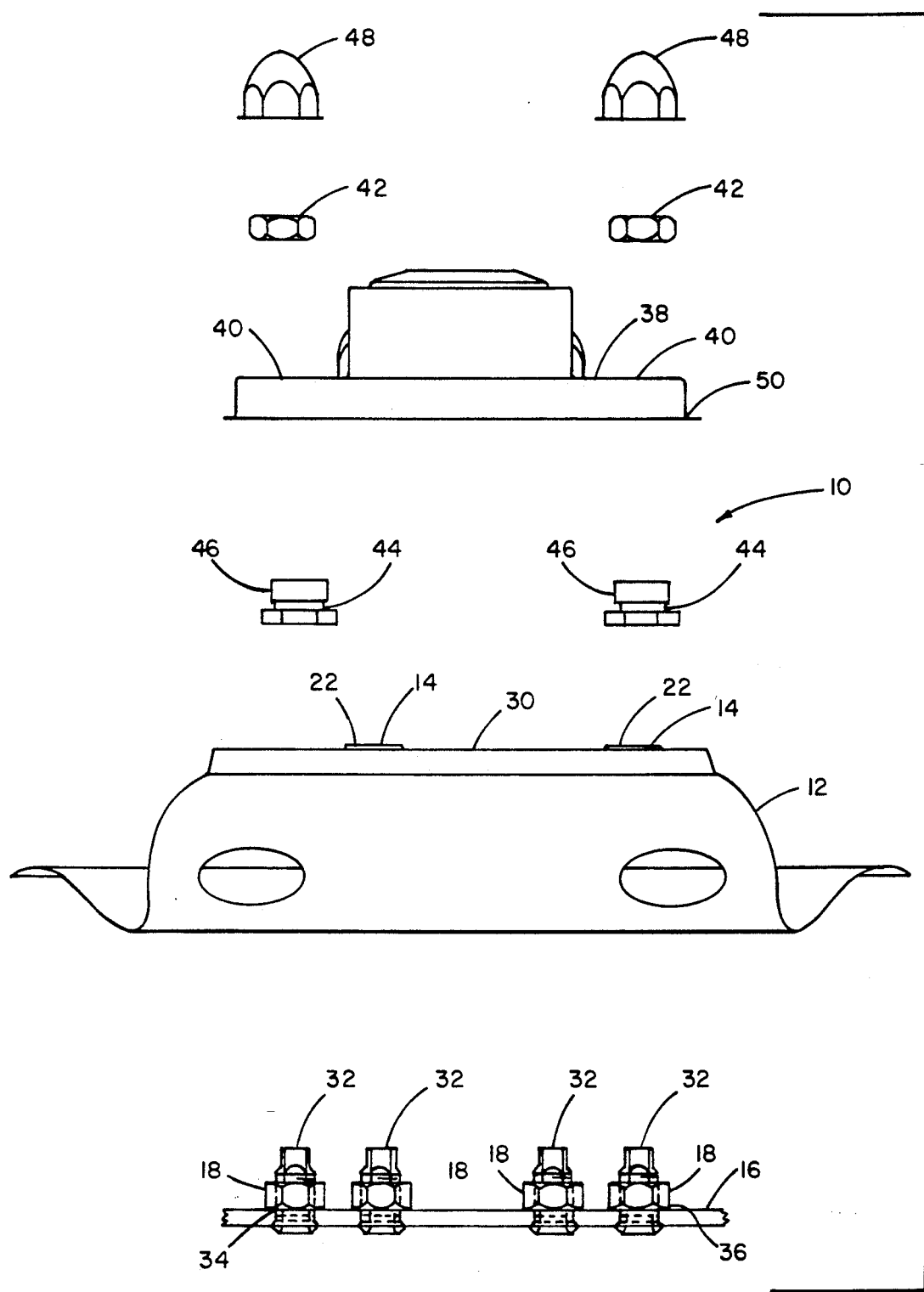
FIG. 4 is an exploded view of the wheel trim attachments attached to a front or shallow well wheel.

As can be seen in FIG. 2, reverse draw 22 frictionally fits around lug nut 18 so as to hold trim member 12 in place. Frictional fit of reverse draw 22 against lug nut 18 is, in the preferred embodiment, capable of holding trim member 12 on a wheel. Referring now to FIGS. 3 and 4 there is shown generally at 10 the system of the present invention as it attaches to wheel 16. In FIG. 3, wheel 16 is a rear wheel whereas in FIG. 4, wheel 16 is a front wheel. Trim member 12 has base 30 which approximately contacts wheel 16. Trim member 12 also has holes 14 to receive existing lug nuts 18 which receive studs 32. In the preferred embodiment, trim member 12 has as many holes 14 as is necessary to receive existing lug nuts 18. However, in the preferred embodiment, only one or two of holes 14 is provided with reverse draw 22. The need for reverse draw 22 is shown by viewing FIGS. 3 and 4. Lug nuts 18, hold wheel 16 on studs 32. Presently, most wheels 16 are ball seated or have ball seats 34. Ball seat 34 simply means that the place into which lug nut 18 resides has a rounded seat. In order to best fit within ball seat 34, lower portion of lug nut 18 is also in the shape of a ball. This creates slight gap 36 between lug nut 18 and wheel 16. Gap 36 allows sharp edges to slide because normal holes 14 must be big enough to fit over the outer edges of lug nuts 18. Therefore, holes 14 are larger than the area within gap 36. Reverse draw 22 frictionally fits over lug nut 18 despite gap 36. Further, reverse draw 22 also provides a larger area of frictional fit on lug nut 18 than a sharp edge.

Referring now to FIGS. 3 and 4, one can see how the trim system of the present invention is attached to wheel 16. Without removing existing lug nuts 18, trim member 12 is placed onto wheel with holes 14 receiving first studs 32 and then lug nuts 18. The one or two holes 14 having reverse draw 22 are then forced over lug nuts 18 to overcome frictional force and are thereby resulting in trim member 12 being frictionally attached to lug nuts 18 and to wheel 16. Should studs 32 be long enough, hub cover 38 having orifices 40 is placed on wheel 16 after trim member 12 with orifices 40 receiving first studs 32 and then lug nuts 18. Jam nuts 42 then are placed onto one or two of the studs to attach hub cover 38 to wheel 16. If studs 32 are not long enough, stud extenders 44 are placed over exposed studs 32 after trim member 12 has been placed on wheel 16. Stud extender 44 has exposed threads 46. Orifices 40 in hub cover 38 receives stud extenders 44 and jam nuts 42 receives threaded portion 46 of stud extender 44 thereby attaching hub cover 38 to wheel 16. Decorative lug nut covers 48 are then frictionally placed over jam nuts 42. In the preferred embodiment, only two jam nuts 42 are used. The remaining orifices 40 can have lug nut covers integrally molded proximate to orifices so that they do not have to be removed.

As stated above, in the preferred embodiment, trim member 12 can be attached to wheel 16 using reverse draws 22. However, jam nuts 42 can be used to better attach trim member 12 and system 10 to wheel 16. In the preferred embodiment, only one or two reverse draws is necessary to attach trim member 12 to lug nut 18. However, as many reverse draws 22 as desired can be used. Also, in the preferred embodiment, only two jam nuts 42 and consequently only two stud extenders 44 are necessary to attach hub cover 38 to wheel 16. However, any number of jam nuts 42 can be used including one.

As can be seen in FIGS. 3 and 4, hub covers 38 also have a flange or reverse draw 50 which is the area of hub cover 38 which contacts trim member 12. This flange or reverse draw 50 provides a larger surface of contact thereby reducing the rate of crackage, failure, or cutting.

A standard lug nut 18 has an outer diameter of forty-one millimeters. Therefore, hole 14 and reverse draw 22 must have the same diameter for frictional fit. However, the system of the present invention can be used with any size or shape lug nut 18.

In the preferred embodiment, reverse draw 22 is approximately perpendicular to base 30. However, if so desired, reverse draw can be slightly angled inwardly toward center.

Thus, although there have been described particular embodiments of the present invention of a new and useful reverse drawn wheel trim system, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A wheel trim system for attachment to a wheel of a vehicle, said wheel having stud engaged by a lug nut, said system comprising:
   a. a wheel trim member having a hole for receiving said lug nut and a flange surrounding said hole, said flange sized to frictionally engage said lug nut;
   b. means attached to said stud for releasably attaching said trim member to said wheel;
   c. a hub cover;
   d. means for releasably attaching said hub cover to said wheel;
   e. said means for releasably attaching said trim member to said wheel comprises a stud extender attachable to said stud; and
   f. said means for releasably attaching said hub cover to said wheel comprises a jam nut attachable to said stud extender.

2. The system of claim 1 further comprising a lug nut cover frictionally attached to said jam nut.

3. A wheel trim system attachable to a wheel having a lug nut and a stud, said system comprising:
   a. a trim member having a hole receivable of said lug nut;
   b. said trim member having a reverse draw surrounding said hole, said reverse draw sized to frictionally attach to said lug nut;
   c. means attached to said stud for releasably attaching said trim member to said wheel;
   d. a hub cover;
   e. means for releasably attaching said hub cover to said wheel;
   f. said means for releasably attaching said trim member to said wheel comprises a stud extender attachable to said stud; and
   g. said means for releasably attaching said hub cover to said wheel comprises a jam nut attachable to said stud extender.

4. The wheel trim system of claim 3 further comprising a lug nut cover frictionally attached to said jam nut.

* * * * *